(12) United States Patent
Parks et al.

(10) Patent No.: US 12,286,111 B2
(45) Date of Patent: Apr. 29, 2025

(54) VEHICLE SYSTEMS AND RELATED METHODS TO AUTONOMOUSLY INCREASE CAMERA RANGE

(71) Applicant: GM GLOBAL TECHNOLOGY OPERATIONS LLC, Detroit, MI (US)

(72) Inventors: Jeffrey Scott Parks, Ann Arbor, MI (US); Paul A. Adam, Milford, MI (US); Namal P. Kumara, Ypsilanti, MI (US); Harsh Ketan Patel, Farmington Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 372 days.

(21) Appl. No.: 17/807,058

(22) Filed: Jun. 15, 2022

(65) Prior Publication Data

US 2023/0406301 A1    Dec. 21, 2023

(51) Int. Cl.
*B60W 30/16* (2020.01)
*B60W 10/20* (2006.01)
(Continued)

(52) U.S. Cl.
CPC ............ *B60W 30/16* (2013.01); *B60W 10/20* (2013.01); *B60W 30/12* (2013.01); *B60W 40/04* (2013.01); *B60W 40/105* (2013.01); *B60W 40/12* (2013.01); *B60W 60/001* (2020.02); *G06V 20/58* (2022.01); *G06V 20/588* (2022.01); *B60W 2420/403* (2013.01); *B60W 2540/18* (2013.01); *B60W 2552/53* (2020.02); *B60W 2554/802* (2020.02)

(58) Field of Classification Search
CPC ...... B60W 30/16; B60W 10/20; B60W 30/12; B60W 40/04; B60W 40/105; B60W 40/12; B60W 60/001; B60W 2420/403; B60W 2540/18; B60W 2552/53; B60W 2554/802; B60W 2556/65; G06V 20/58; G06V 20/588

See application file for complete search history.

(56) References Cited

U.S. PATENT DOCUMENTS

2018/0045832 A1*   2/2018   Ibrahim ................... B60Q 9/00
2021/0109539 A1*   4/2021   Marin ................ B60W 60/0011

FOREIGN PATENT DOCUMENTS

WO    WO2021076705 A2 *   4/2021   ............ B60W 10/20

* cited by examiner

*Primary Examiner* — Rachid Bendidi
*Assistant Examiner* — Kirsten Jade M Santos
(74) *Attorney, Agent, or Firm* — Lorenz & Kopf LLP

(57) ABSTRACT

Vehicles and related systems and methods are provided for controlling a vehicle in an autonomous operating mode. One method involves determining a current value for a range of view associated with a sensing device onboard the vehicle, determining a target value for the range of view based at least in part on a speed of the vehicle, and in response to determining the current value is less than the target value, determining a dropback adjustment distance based at least in part on a difference between target value for the range of view and an estimated distance to a closest in path (CIP) vehicle ahead of the vehicle within a current lane of travel, determining a longitudinal trajectory for the vehicle based at least in part on the dropback adjustment distance, and autonomously operating one or more actuators onboard the vehicle in accordance with the longitudinal trajectory.

20 Claims, 7 Drawing Sheets

(51) Int. Cl.
*B60W 30/12* (2020.01)
*B60W 40/04* (2006.01)
*B60W 40/105* (2012.01)
*B60W 40/12* (2012.01)
*B60W 60/00* (2020.01)
*G06V 20/56* (2022.01)
*G06V 20/58* (2022.01)

VEHICLE SYSTEMS AND RELATED METHODS TO AUTONOMOUSLY INCREASE CAMERA RANGE

INTRODUCTION

The technical field generally relates to vehicle systems and more particularly relates to autonomous operation of a vehicle to increase the forward range of view of a sensing device, such as a camera or image sensor.

An autonomous vehicle is a vehicle that is capable of sensing its environment and navigating with little or no user input. An autonomous vehicle senses its environment using sensing devices such as radar, lidar, image sensors, and the like. The autonomous vehicle system further uses information from global positioning systems (GPS) technology, navigation systems, vehicle-to-vehicle communication, vehicle-to-infrastructure technology, and/or drive-by-wire systems to navigate the vehicle.

Vehicle automation has been categorized into numerical levels ranging from Zero, corresponding to no automation with full human control, to Five, corresponding to full automation with no human control. Various automated driver-assistance systems, such as cruise control, adaptive cruise control, and parking assistance systems correspond to lower automation levels, while true "driverless" vehicles correspond to higher automation levels.

Due to the sheer number of different variables in a real-world environment, an autonomous vehicle control system could encounter an environment or scenario where assistance may be desired. For example, traffic, road conditions and other obstacles or scenarios can be encountered that inhibit the ability of the control system to arrive at a solution for how to autonomously operate the vehicle in the context of lane boundaries or other restrictions or constraints for which compliance is sought. In lower-level automation systems (e.g., Level Three or below), such scenarios may require a driver or other vehicle occupant could manually control or operate the vehicle in some instances, which introduces a burden on a rider that is somewhat contrary to the intent of the automation. Accordingly, it is desirable to provide vehicle control systems and methods that are capable of autonomously resolving a scenario where reduced forward range of view could inhibit arriving at a satisfactory solution for how to autonomously operate the vehicle. Other desirable features and characteristics of the present invention will become apparent from the subsequent detailed description and the appended claims, taken in conjunction with the accompanying drawings and the foregoing technical field and background.

SUMMARY

Apparatus for a vehicle and related methods for controlling the vehicle in an autonomous operating mode are provided. One method of controlling a vehicle in an autonomous operating mode involves determining, by a controller associated with the vehicle, a current value for a range of view associated with a sensing device onboard the vehicle, determining, by the controller, a target value for the range of view associated with the sensing device based at least in part on a speed of the vehicle, and in response to determining the current value is less than the target value, determining, by the controller, a dropback adjustment distance based at least in part on a difference between the target value for the range of view and an estimated distance to a closest in path (CIP) vehicle ahead of the vehicle within a current lane of travel, determining, by the controller, a longitudinal trajectory for the vehicle based at least in part on the dropback adjustment distance to increase the estimated distance to the CIP vehicle, and autonomously operating, by the controller, one or more actuators onboard the vehicle in accordance with the longitudinal trajectory.

In one aspect, determining the target value involves obtaining the target value from a lookup table maintained in a data storage associated with the vehicle using the speed of the vehicle. In another aspect, the method involves determining, by the controller, when a second difference between a current speed of the vehicle and an initial speed of the vehicle associated with the target value is greater than a threshold, and in response to determining the second difference is greater than the threshold, determining, by the controller, an updated target value for the range of view associated with the sensing device based at least in part on the current speed of the vehicle, determining, by the controller, an updated dropback adjustment distance based at least in part on the updated target value and a current estimated distance between the CIP vehicle and the vehicle, determining, by the controller, an updated longitudinal trajectory for the vehicle based at least in part on the updated dropback adjustment distance, and autonomously operating, by the controller, one or more actuators onboard the vehicle in accordance with the updated longitudinal trajectory. In another aspect, the method involves progressively reducing the dropback adjustment distance when the CIP vehicle is no longer present ahead of the vehicle within the current lane of travel. In yet another aspect, the method involves progressively reducing the dropback adjustment distance when a number of consecutive cutoff events is greater than a threshold. In another aspect, the method involves determining, by the controller, a lateral offset adjustment distance in response to determining the current value is less than the target value when a width associated with the CIP vehicle is greater than a threshold, determining, by the controller, a lateral trajectory for the vehicle based at least in part on the lateral offset adjustment distance to offset the vehicle relative to a centerline associated with the current lane of travel, and autonomously operating, by the controller, the one or more actuators onboard the vehicle in accordance with the lateral trajectory while concurrently operating the one or more actuators onboard the vehicle in accordance with the longitudinal trajectory.

In one aspect, determining the current value for the range of view involves calculating, by the controller, a rolling average of a first estimated viewable length associated with a left boundary of the current lane of travel and a second estimated viewable length associated with a right boundary of the current lane of travel over a preceding time interval. One aspect of the method further involves determining, by the controller, the first estimated viewable length associated with the left boundary of the current lane of travel and the second estimated viewable length associated with the right boundary of the current lane of travel based at least in part on one or more images or sensor data captured by the sensing device.

An apparatus for a vehicle is provided that includes a data storage to maintain a lookup table, one or more sensing devices onboard the vehicle, one or more actuators onboard the vehicle, and a controller that, by a processor, determines a current value for a range of view associated with a sensing device of the one or more sensing devices, determines a target value for the range of view associated with the sensing device based at least in part on a speed of the vehicle using the lookup table, determines a dropback adjustment distance based at least in part on a difference between the target value for the range of view and an estimated distance to a closest in path (CIP) vehicle ahead of the vehicle within a current lane of travel when the current value is less than the target value, determines a longitudinal trajectory for the vehicle based at least in part on the dropback adjustment distance to increase the estimated distance to the CIP vehicle, and autonomously operates the one or more actuators onboard the vehicle in accordance with the longitudinal trajectory. In one aspect, the sensing device is a camera.

In another aspect, the controller determines the current value for the range of view by calculating a rolling average of a first estimated viewable length associated with a left boundary of the current lane of travel and a second estimated viewable length associated with a right boundary of the current lane of travel over a preceding time interval. In a further aspect, the sensing device is a camera and the controller determines the first estimated viewable length associated with the left boundary of the current lane of travel and the second estimated viewable length associated with the right boundary of the current lane of travel based at least in part on one or more images captured by the camera. In another aspect, the controller progressively reduces the dropback adjustment distance when the CIP vehicle is no longer present ahead of the vehicle within the current lane of travel. In yet another aspect, the controller progressively reduces the dropback adjustment distance when a number of consecutive cutoff events is greater than a threshold. In another aspect, the controller determines a lateral offset adjustment distance in response to determining the current value is less than the target value when a width associated with the CIP vehicle is greater than a threshold, determines a lateral trajectory for the vehicle based at least in part on the lateral offset adjustment distance to offset the vehicle relative to a centerline associated with the current lane of travel, and autonomously operates the one or more actuators onboard the vehicle in accordance with the lateral trajectory while concurrently operating the one or more actuators onboard the vehicle in accordance with the longitudinal trajectory.

In another aspect, an apparatus is provided for a non-transitory computer-readable medium having executable instructions stored thereon that, when executed by a processor, cause the processor to determine a current value for a range of view associated with a sensing device onboard a vehicle, determine a target value for the range of view associated with the sensing device based at least in part on a speed of the vehicle, in response to determining the current value is less than the target value, determine a dropback adjustment distance based at least in part on a difference between the target value for the range of view and an estimated distance to a closest in path (CIP) vehicle ahead of the vehicle within a current lane of travel, determine a longitudinal trajectory for the vehicle based at least in part on the dropback adjustment distance to increase the estimated distance to the CIP vehicle, and autonomously operate one or more actuators onboard the vehicle in accordance with the longitudinal trajectory.

In one aspect, the executable instructions cause the processor to determine a lateral offset adjustment distance in response to determining the current value is less than the target value when a width associated with the CIP vehicle is greater than a threshold, determine a lateral trajectory for the vehicle based at least in part on the lateral offset adjustment distance to offset the vehicle relative to a centerline associated with the current lane of travel, and autonomously operate the one or more actuators onboard the vehicle in accordance with the lateral trajectory while concurrently operating the one or more actuators onboard the vehicle in accordance with the longitudinal trajectory. In another aspect, the executable instructions cause the processor to determine the current value for the range of view by calculating a rolling average of a first estimated viewable length associated with a left boundary of the current lane of travel and a second estimated viewable length associated with a right boundary of the current lane of travel over a preceding time interval. In a further aspect, the executable instructions cause the processor to determine the first estimated viewable length associated with the left boundary of the current lane of travel and the second estimated viewable length associated with the right boundary of the current lane of travel based at least in part on one or more images or sensor data captured by the sensing device. In a further aspect, the sensing device is a camera onboard the vehicle and the executable instructions cause the processor to determine the first estimated viewable length and the second estimated viewable length based at least in part on the one or more images captured by the camera onboard the vehicle.

BRIEF DESCRIPTION OF THE DRAWINGS

The exemplary aspects will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding introduction, summary, or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Figure 1:
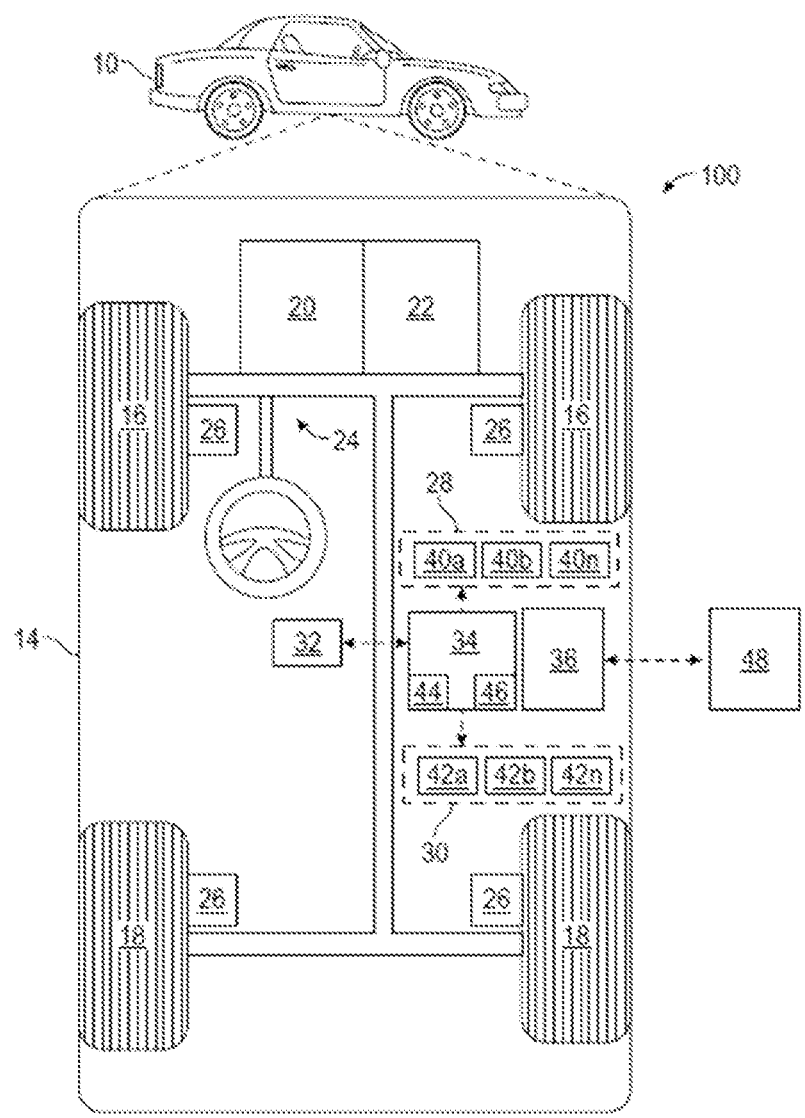
FIG. 1 is a block diagram illustrating an autonomous vehicle control system for a vehicle in accordance with various implementations.

Referring now to FIG. 1, in accordance with one or more implementations, an autonomous vehicle control system shown 100 determines a plan for autonomously operating a vehicle 10 along a route in a manner that accounts for objects or obstacles detected by onboard sensors 28, 40, as described in greater detail below. In this regard, a control module onboard the vehicle 10 calibrates different types of onboard sensors 28, 40 with respect to one another and/or the vehicle 10, thereby allowing data from those different types of onboard sensors 28, 40 to be spatially associated or otherwise with one another based on the calibration for purposes of object detection, object classification, and the resulting autonomous operation of the vehicle 10.

As depicted in FIG. 1, the vehicle 10 generally includes a chassis, a body 14, and front and rear wheels 16, 18 rotationally coupled to the chassis near a respective corner of the body 14. The body 14 is arranged on the chassis and substantially encloses components of the vehicle 10, and the body 14 and the chassis may jointly form a frame.

In exemplary implementations, the vehicle 10 is an autonomous vehicle or is otherwise configured to support one or more autonomous operating modes, and the control system 100 is incorporated into the vehicle 10 (hereinafter referred to as the vehicle 10). The vehicle 10 is depicted in the illustrated implementation as a passenger car, but it should be appreciated that any other vehicle including motorcycles, trucks, sport utility vehicles (SUVs), recreational vehicles (RVs), marine vessels, aircraft, etc., can also be used. In an exemplary implementation, the vehicle 10 is a so-called Level Two automation system. A Level Two system indicates "partial driving automation," referring to the driving mode-specific performance by an automated driving system to control steering, acceleration and braking in specific scenarios while a driver remains alert and actively supervises the automated driving system at all times and is capable of providing driver support to control primary driving tasks.

As shown, the vehicle 10 generally includes a propulsion system 20, a transmission system 22, a steering system 24, a brake system 26, a sensor system 28, an actuator system 30, at least one data storage device 32, at least one controller 34, and a communication system 36. The propulsion system 20 may, in various implementations, include an internal combustion engine, an electric machine such as a traction motor, and/or a fuel cell propulsion system. The transmission system 22 is configured to transmit power from the propulsion system 20 to the vehicle wheels 16, 18 according to selectable speed ratios. According to various implementations, the transmission system 22 may include a step-ratio automatic transmission, a continuously-variable transmission, or other appropriate transmission. The brake system 26 is configured to provide braking torque to the vehicle wheels 16, 18. The brake system 26 may, in various implementations, include friction brakes, brake by wire, a regenerative braking system such as an electric machine, and/or other appropriate braking systems. The steering system 24 influences a position of the of the vehicle wheels 16, 18. While depicted as including a steering wheel for illustrative purposes, in some implementations contemplated within the scope of the present disclosure, the steering system 24 may not include a steering wheel.

The sensor system 28 includes one or more sensing devices 40a-40n that sense observable conditions of the exterior environment and/or the interior environment of the vehicle 10. The sensing devices 40a-40n can include, but are not limited to, radars, lidars, global positioning systems, optical cameras, thermal cameras, ultrasonic sensors, and/or other sensors. The actuator system 30 includes one or more actuator devices 42a-42n that control one or more vehicle features such as, but not limited to, the propulsion system 20, the transmission system 22, the steering system 24, and the brake system 26. In various implementations, the vehicle features can further include interior and/or exterior vehicle features such as, but are not limited to, doors, a trunk, and cabin features such as air, music, lighting, etc. (not numbered).

The data storage device 32 stores data for use in automatically controlling the vehicle 10. In various implementations, the data storage device 32 stores defined maps of the navigable environment. In various implementations, the defined maps may be predefined by and obtained from a remote system. For example, the defined maps may be assembled by the remote system and communicated to the vehicle 10 (wirelessly and/or in a wired manner) and stored in the data storage device 32. As can be appreciated, the data storage device 32 may be part of the controller 34, separate from the controller 34, or part of the controller 34 and part of a separate system.

The controller 34 includes at least one processor 44 and a computer readable storage device or media 46. The processor 44 can be any custom made or commercially available processor, a central processing unit (CPU), a graphics processing unit (GPU), an auxiliary processor among several processors associated with the controller 34, a semiconductor-based microprocessor (in the form of a microchip or chip set), a macroprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the vehicle 10.

The instructions may include one or more separate programs, each of which comprises an ordered listing of executable instructions for implementing logical functions. The instructions, when executed by the processor 44, receive and process signals from the sensor system 28, perform logic, calculations, methods and/or algorithms for automatically controlling the components of the vehicle 10, and generate control signals to the actuator system 30 to automatically control the components of the vehicle 10 based on the logic, calculations, methods, and/or algorithms. Although only one controller 34 is shown in FIG. 1, embodiments of the vehicle 10 can include any number of controllers 34 that communicate over any suitable communication medium or a combination of communication mediums and that cooperate to process the sensor signals, perform logic, calculations, methods, and/or algorithms, and generate control signals to automatically control features of the vehicle 10.

In various implementations, one or more instructions of the controller 34 are embodied in the control system 100 (e.g., in data storage element 46) and, when executed by the processor 44, cause the processor 44 to obtain data captured or generated from imaging and ranging devices 40 and utilize the captured environmental data to determine commands for autonomously operating the vehicle 10, as described in greater detail below. In one or more exemplary implementations, the data storage element 46 maintains a lookup table of lateral planning information that may be utilized to determine corresponding lateral reference trajectories for maneuvering laterally into an adjacent lane, with the lateral planning information and resulting reference lateral trajectory being utilized or otherwise referenced by the processor 44 to determine commands for autonomously operating the vehicle 10 when the normal vehicle guidance or control scheme supported by the processor 44 encounters a deadline or other temporal constraint for a time-sensitive lateral maneuver to avoid having to solve for a commanded vehicle path within a limited period of time.

Still referring to FIG. 1, in exemplary implementations, the communication system 36 is configured to wirelessly communicate information to and from other entities 48 over a communication network, such as but not limited to, other vehicles ("V2V" communication,) infrastructure ("V2I" communication), remote systems, and/or personal devices. In an exemplary implementation, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

The communication network utilized by the communication system 36 can include a wireless carrier system such as a cellular telephone system that includes a plurality of cell towers (not shown), one or more mobile switching centers (MSCs) (not shown), as well as any other networking components required to connect the wireless carrier system with a land communications system, and the wireless carrier system can implement any suitable communications technology, including for example, digital technologies such as CDMA (e.g., CDMA2000), LTE (e.g., 4G LTE or 5G LTE), GSM/GPRS, or other current or emerging wireless technologies. Additionally, or alternatively, a second wireless carrier system in the form of a satellite communication system can be utilized to provide uni-directional or bi-directional communication using one or more communication satellites (not shown) and an uplink transmitting station (not shown), including, but not limited to satellite radio services, satellite telephony services and/or the like. Some implementations may utilize a land communication system, such as a conventional land-based telecommunications network including a public switched telephone network (PSTN) used to provide hardwired telephony, packet-switched data communications, and the Internet infrastructure. One or more segments of a land communication system can be implemented using a standard wired network, a fiber or other optical network, a cable network, power lines, other wireless networks such as wireless local area networks (WLANs), or networks providing broadband wireless access (BWA), or any combination thereof.

Figure 2:
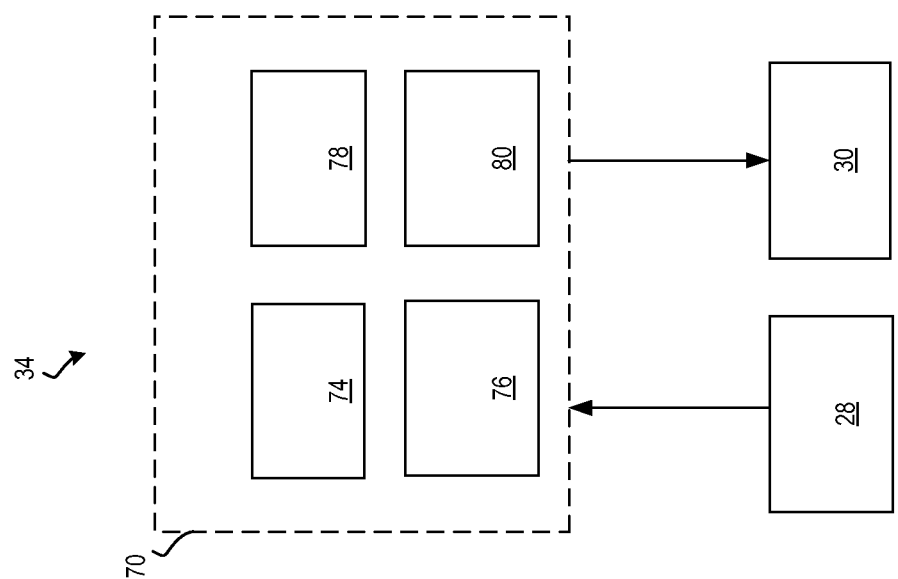
FIG. 2 is a block diagram of an automated driving system (ADS) suitable for implementation by the autonomous vehicle control system of the vehicle of FIG. 1 in accordance with various implementations.

Referring now to FIG. 2, in accordance with various implementations, controller 34 implements an autonomous driving system (ADS) 70. That is, suitable software and/or hardware components of controller 34 (e.g., processor 44 and computer-readable storage device 46) are utilized to provide an autonomous driving system 70 that is used in conjunction with vehicle 10, for example, to automatically control various actuators 30 and thereby control vehicle acceleration, steering, and braking, respectively, without human intervention.

In various implementations, the instructions of the autonomous driving system 70 may be organized by function or system. For example, as shown in FIG. 2, the autonomous driving system 70 can include a sensor fusion system 74, a positioning system 76, a guidance system 78, and a vehicle control system 80. As can be appreciated, in various implementations, the instructions may be organized into any number of systems (e.g., combined, further partitioned, etc.) as the disclosure is not limited to the present examples.

In various implementations, the sensor fusion system 74 synthesizes and processes sensor data and predicts the presence, location, classification, and/or path of objects and features of the environment of the vehicle 10. In various implementations, the sensor fusion system 74 can incorporate information from multiple sensors, including but not limited to, cameras, lidars, radars, and/or any number of other types of sensors. In one or more exemplary implementations described herein, the sensor fusion system 74 correlates image data to lidar point cloud data, the vehicle reference frame, or some other reference coordinate frame using calibrated conversion parameter values associated with the pairing of the respective camera and reference frame to relate lidar points to pixel locations, assign depths to the image data, identify objects in one or more of the image data and the lidar data, or otherwise synthesize associated image data and lidar data. In other words, the sensor output from the sensor fusion system 74 provided to the vehicle control system 80 (e.g., indicia of detected objects and/or their locations relative to the vehicle 10) reflects or is otherwise influenced by the calibrations and associations between camera images, lidar point cloud data, and the like.

The positioning system 76 processes sensor data along with other data to determine a position (e.g., a local position relative to a map, an exact position relative to lane of a road, vehicle heading, velocity, etc.) of the vehicle 10 relative to the environment. The guidance system 78 processes sensor data along with other data to determine a path for the vehicle 10 to follow given the current sensor data and vehicle pose. The vehicle control system 80 then generates control signals for controlling the vehicle 10 according to the determined path. In various implementations, the controller 34 implements machine learning techniques to assist the functionality of the controller 34, such as feature detection/classification, obstruction mitigation, route traversal, mapping, sensor integration, ground-truth determination, and the like.

In one or more implementations, the guidance system 78 includes a motion planning module that generates a motion plan for controlling the vehicle as it traverses along a route. The motion planning module includes a longitudinal solver module that generates a longitudinal motion plan output for controlling the movement of the vehicle along the route in the general direction of travel, for example, by causing the vehicle to accelerate or decelerate at one or more locations in the future along the route to maintain a desired speed or velocity. The motion planning module also includes a lateral solver module that generates a lateral motion plan output for controlling the lateral movement of the vehicle along the route to alter the general direction of travel, for example, by steering the vehicle at one or more locations in the future along the route (e.g., to maintain the vehicle centered within a lane, change lanes, etc.). The longitudinal and lateral plan outputs correspond to the commanded (or planned) path output provided to the vehicle control system 80 for controlling the vehicle actuators 30 to achieve movement of the vehicle 10 along the route that corresponds to the longitudinal and lateral plans.

During normal operation, the longitudinal solver module attempts to optimize the vehicle speed (or velocity) in the direction of travel, the vehicle acceleration in the direction of travel, and the derivative of the vehicle acceleration in the direction of travel, alternatively referred to herein as the longitudinal jerk of the vehicle, and the lateral solver module attempts to optimize one or more of the steering angle, the rate of change of the steering angle, and the acceleration or second derivative of the steering angle, alternatively referred to herein as the lateral jerk of the vehicle. In this regard, the steering angle can be related to the curvature of the path or route, and any one of the steering angle, the rate of change of the steering angle, and the acceleration or second derivative of the steering angle can be optimized by the lateral solver module, either individually or in combination.

In an exemplary implementation, the longitudinal solver module receives or otherwise obtains the current or instantaneous pose of the vehicle, which includes the current position or location of the vehicle, the current orientation of the vehicle, the current speed or velocity of the vehicle, and the current acceleration of the vehicle. Using the current position or location of the vehicle, the longitudinal solver module also retrieves or otherwise obtains route information which includes information about the route the vehicle is traveling along given the current pose and plus some additional buffer distance or time period (e.g., 12 seconds into the future), such as, for example, the current and future road grade or pitch, the current and future road curvature, current and future lane information (e.g., lane types, boundaries, and other constraints or restrictions), as well as other constraints or restrictions associated with the roadway (e.g., minimum and maximum speed limits, height or weight restrictions, and the like). The route information may be obtained from, for example, an onboard data storage element 32, an online database, or other entity. In one or more implementations, the lateral route information may include the planned lateral path command output by the lateral solver module, where the longitudinal and lateral solver modules iteratively derive an optimal travel plan along the route.

The longitudinal solver module also receives or otherwise obtains the current obstacle data relevant to the route and current pose of the vehicle, which may include, for example, the location or position, size, orientation or heading, speed, acceleration, and other characteristics of objects or obstacles in a vicinity of the vehicle or the future route. The longitudinal solver module also receives or otherwise obtains longitudinal vehicle constraint data which characterizes or otherwise defines the kinematic or physical capabilities of the vehicle for longitudinal movement, such as, for example, the maximum acceleration and the maximum longitudinal jerk, the maximum deceleration, and the like. The longitudinal vehicle constraint data may be specific to each particular vehicle and may be obtained from an onboard data storage element 32 or from a networked database or other entity 48, 52, 54. In some implementations, the longitudinal vehicle constraint data 416 may be calculated or otherwise determined dynamically or substantially in real-time based on the current mass of the vehicle, the current amount of fuel onboard the vehicle, historical or recent performance of the vehicle, and/or potentially other factors. In one or more implementations, the longitudinal vehicle constraint data is calculated or determined in relation to the lateral path, the lateral vehicle constraint data, and/or determinations made by the lateral solver module. For example, the maximum longitudinal speed may be constrained at a particular location by the path curvature and the maximum lateral acceleration by calculating the maximum longitudinal speed as a function of the path curvature and the maximum lateral acceleration (which itself could be constrained by rider preferences or vehicle dynamics). In this regard, at locations where the degree of path curvature is relatively high (e.g., sharp turns), the maximum longitudinal speed may be limited accordingly to maintain comfortable or achievable lateral acceleration along the curve.

Using the various inputs to the longitudinal solver module, the longitudinal solver module calculates or otherwise determines a longitudinal plan (e.g., planned speed, acceleration and jerk values in the future as a function of time) for traveling along the route within some prediction horizon (e.g., 12 seconds) by optimizing some longitudinal cost variable or combination thereof (e.g., minimizing travel time, minimizing fuel consumption, minimizing jerk, or the like) by varying the speed or velocity of the vehicle from the current pose in a manner that ensures the vehicle complies with longitudinal ride preference information to the extent possible while also complying with lane boundaries or other route constraints and avoiding collisions with objects or obstacles. In this regard, in many conditions, the resulting longitudinal plan generated by the longitudinal solver module does not violate the maximum vehicle speed, the maximum vehicle acceleration, the maximum deceleration, and the maximum longitudinal jerk settings associated with the user, while also adhering to the following distances or buffers associated with the user. That said, in some scenarios, violating one or more longitudinal ride preference settings may be necessary to avoid collisions, comply with traffic signals, or the like, in which case, the longitudinal solver module may attempt to maintain compliance of as many of the user-specific longitudinal ride preference settings as possible. Thus, the resulting longitudinal plan generally complies with the user's longitudinal ride preference information but does not necessarily do so strictly.

In a similar manner, the lateral solver module receives or otherwise obtains the current vehicle pose and the relevant route information and obstacle data for determining a lateral travel plan solution within the prediction horizon. The lateral solver module also receives or otherwise obtains lateral vehicle constraint data which characterizes or otherwise defines the kinematic or physical capabilities of the vehicle for lateral movement, such as, for example, the maximum steering angle or range of steering angles, the minimum turning radius, the maximum rate of change for the steering angle, and the like. The lateral vehicle constraint data may also be specific to each particular vehicle and may be obtained from an onboard data storage element 32 or from a networked database or other entity 48, 52, 54. The lateral solver module may also receive or otherwise obtain user-specific lateral ride preference information which includes, for example, user-specific values or settings for the steering rate (e.g., a maximum rate of change for the steering angle, a maximum acceleration of the steering angle, and/or the like), the lateral jerk, and the like. The lateral ride preference information may also include user-specific distances or buffers, such as, for example, a minimum and/or maximum distance from lane boundaries, a minimum lateral buffer or lateral separation distance between objects or obstacles, and the like, and potentially other user-specific lane preferences (e.g., a preferred lane of travel).

Using the various inputs to the lateral solver module, the lateral solver module calculates or otherwise determines a lateral plan for traveling along the route at future locations within some prediction horizon (e.g., 50 meters) by optimizing some lateral cost variable or combination thereof (e.g., minimizing deviation from the center of the roadway, minimizing the curvature of the path, minimizing lateral jerk, or the like) by varying the steering angle or vehicle wheel angle in a manner that ensures the vehicle complies with the lateral ride preference information to the extent possible while also complying with lane boundaries or other route constraints and avoiding collisions with objects or obstacles.

During normal operation, the lateral solver module may utilize the longitudinal travel plan from the longitudinal solver module along with the route information and obstacle data to determine how to steer the vehicle from the current pose within the prediction horizon while attempting to comply with the lateral ride preference information. In this regard, the resulting longitudinal and lateral travel plans that are ultimately output by the motion planning module comply with as many of the user's ride preferences as possible while optimizing the cost variable and avoiding collisions by varying one or more of the vehicle's velocity, acceleration/deceleration (longitudinally and/or laterally), jerk (longitudinally and/or laterally), steering angle, and steering angle rate of change. The longitudinal travel plan output by the motion planning module includes a sequence of planned velocity and acceleration commands with respect to time for operating the vehicle within the longitudinal prediction horizon (e.g., a velocity plan for the next 12 seconds), and similarly, the lateral travel plan output by the motion planning module includes a sequence of planned steering angles and steering rates with respect to distance or position for steering the vehicle within the lateral prediction horizon while operating in accordance with the longitudinal travel plan (e.g., a steering plan for the next 50 meters). The longitudinal and lateral plan outputs are provided to the vehicle control system 80, which may utilize vehicle localization information and employs its own control schemes to generate control outputs that regulate the vehicle localization information to the longitudinal and lateral plans by varying velocity and steering commands provided to the actuators 30, thereby varying the speed and steering of the vehicle 10 to emulate or otherwise effectuate the longitudinal and lateral plans.

As described in greater detail below, in exemplary implementations, the guidance system 78 supports a hands-free autonomous operating mode that controls steering, acceleration and braking while it is enabled and operating to provide lane centering while attempting to maintain a driver-selected speed and/or following distance (or gap time) relative to other vehicles using the current sensor data (or obstacle data) provided by the sensor fusion system 74 and the current vehicle pose provided by the positioning system 76. In the autonomous operating mode, the guidance system 78 detects, identifies or otherwise determines when a forward range of view of a sensing device 40, such as a camera or other image sensor, is less than a target value corresponding to a desired minimum forward range of view threshold, for example, due to an obstacle or other object in the line of sight of the sensing device 40, the guidance system 78. When the forward range of view is less than the threshold, the guidance system 78 automatically increases the following distance (or gap time) and/or adjusts the lateral position of the vehicle 10 with respect to the lane boundaries (or lane centerline) for a temporary period of time to increase the forward range of view while attempting to maintain the driver-selected speed and avoiding driver interventions or other escalations that could occur when forward range of view is inadequate. For example, a vehicle ahead of the host vehicle 10 (alternatively referred to herein as the closest in path (CIP) vehicle) in the line of sight of a camera or other sensing device 40 may reduce the ability of the sensor fusion system 74 and/or the positioning system 76 to detect or identify lane boundaries beyond the CIP vehicle. Furthermore, in heavy traffic situations, the guidance system 78 must account for vehicles in adjacent lanes as well as curbs or road edges, which limit the ability of the host vehicle 10 to move laterally or change lanes to navigate around the CIP vehicle.

In exemplary implementations described herein, when the current forward range of view of a sensing device 40 is less than a target value corresponding to a desired minimum forward range of view threshold, the guidance system 78 may automatically increase the following distance (or gap time) by a dropback distance to increase the total separation distance between the host vehicle 10 and the CIP vehicle for a temporary period of time to increase the length or amount of the lane boundaries or lane lines that are visible by the sensing device 40 at the host vehicle 10. Additionally, or alternatively, the guidance system 78 may also automatically adjust the lateral position of the host vehicle 10 by some offset relative to the lane centerline to aid lane line detection while avoiding road edges, adjacent vehicles or other potential lateral incursions. By virtue of the dropback distance and lateral offsets, the subject matter described herein allows the guidance system 78 at the host vehicle 10 to maintain confident lane centering control and avoid driver interventions or other escalations when the host vehicle 10 encounters a CIP vehicle that could otherwise limit the ability of the sensor device 40 to capture the desired length of the lane boundaries and/or lane centerline.

Figure 3:
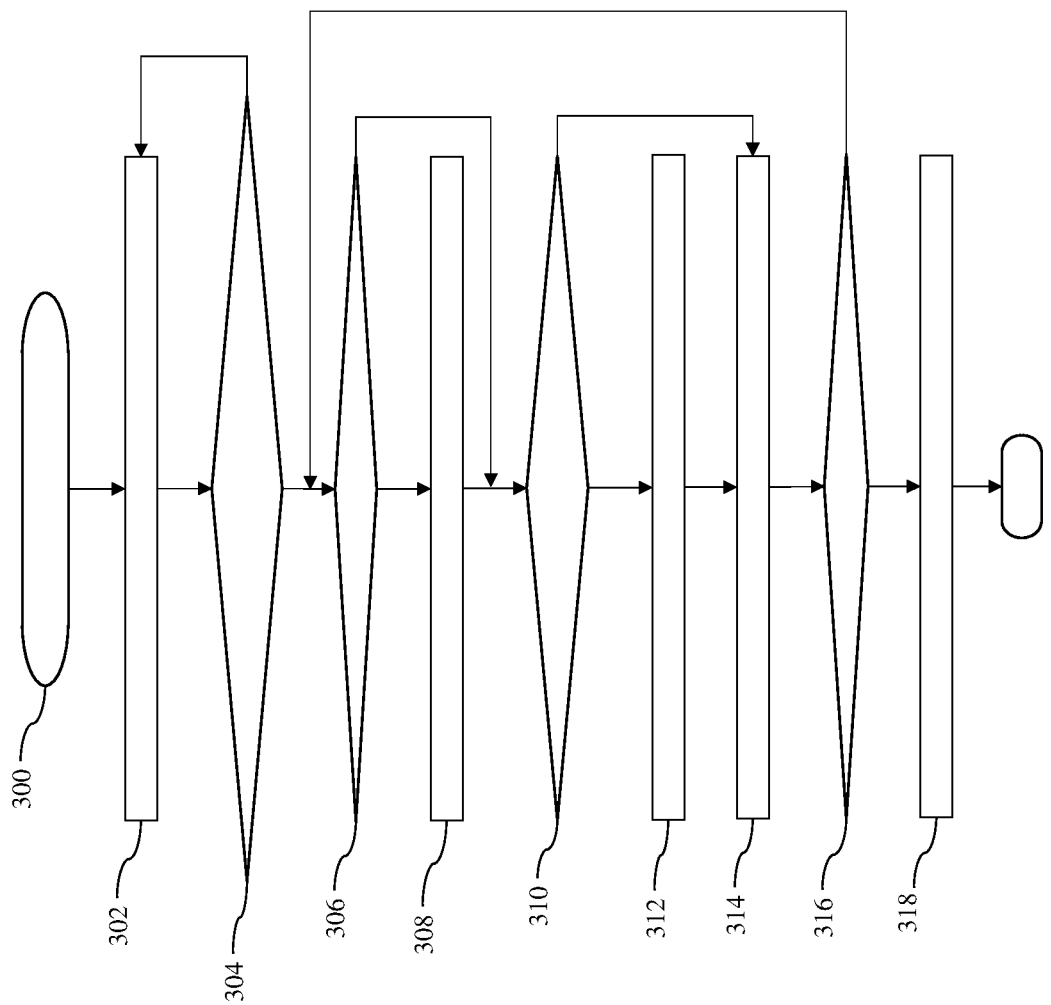
FIG. 3 depicts a flow diagram of a range control process suitable for implementation by the ADS of FIG. 2 in the autonomous vehicle control system of FIG. 1 according to one or more aspects described herein.

FIG. 3 depicts an exemplary implementation of a range control process 300 suitable for implementation by a control module onboard a vehicle (e.g., by the guidance system 78 of the ADS 70 supported by the controller 34 in the vehicle 10) to cause the vehicle to temporarily dropback and/or adjust laterally responsive to a detected obstacle, object or other event that impairs the forward range of a camera, image sensor or other sensing device onboard the vehicle (e.g., sensing device 40). For illustrative purposes, the following description may refer to elements mentioned above in connection with FIGS. 1-2. While portions of the range control process 300 may be performed by different elements of a vehicle system, for purposes of explanation, the subject matter may be primarily described herein in the context of the range control process 300 being primarily performed by the guidance system 78 of the ADS 70 implemented by the controller 34 associated with the vehicle 10. In one or more exemplary aspects, the range control process 300 is performed in connection with the dropback determination process 400 described in greater detail below in the context of FIG. 4 and/or the lateral adjustment process 500 described in greater detail below in the context of FIG. 5.

In exemplary implementations, the range control process 300 identifies or otherwise determines the current forward range of view of a sensing device at 302. In one or more implementations, the current forward range of view is calculated as a rolling average of the estimated viewable lane boundary lengths over a preceding time interval or a preceding number of samples. For example, the sensor fusion system 74 may output an estimated viewable length of the left lane boundary for the current lane of travel and an estimated viewable length of the right lane boundary for the current lane of travel as the vehicle 10 travels, where the estimated viewable lengths of the lane boundaries are determined by the sensor fusion system 74 based at least in part on the images or other sensor data captured and output by the sensing device. The guidance system 78 may periodically sample the outputs of the sensor fusion system 74, for example, during each iteration or update of the control scheme associated with the guidance system 78 to obtain the currently estimated viewable length of the left and right lane boundaries. For each iteration, the guidance system 78 may select or otherwise identify the maximum of the estimated viewable length of the left lane boundary and the estimated viewable length of the right lane boundary as the estimated forward range of view for the sensing device associated with respective iteration. Thereafter, the guidance system 78 dynamically calculates or otherwise determines a rolling average of the estimated forward range of view values (corresponding to the maximum of the estimated viewable length of the left lane boundary and the estimated viewable length of the right lane boundary) over a preceding number of iterations.

At 304, the range control process 300 continues by monitoring the current forward range of view to detect or otherwise identify when the current forward range of view falls below a target value for the forward range of view at 304. In exemplary implementations, the target value for the forward range of view is identified or otherwise determined as a function of the current speed or velocity of the host vehicle 10, for example, by using a lookup table to identify a desired minimum threshold forward range of view for an input vehicle speed or velocity. In this regard, the guidance system 78 obtains the current speed of the vehicle (e.g., from the positioning system 76), utilizes a lookup table to identify the targeted minimum threshold forward range of view for the current vehicle speed, and detects when the current forward range of view (e.g., the rolling average of the estimated forward range of view values) is less than the targeted minimum threshold forward range of view for the current vehicle speed. When the current forward range of view is greater than the targeted minimum threshold forward range of view for the current vehicle speed, the loop defined by 302 and 304 repeats during each iteration or update of the guidance system 78 implementing the range control process 300. As one non-limiting example, the targeted minimum threshold forward range of view may be the greater of a fixed minimum value (e.g., 5 meters) or a function of the current vehicle speed multiplied by a calibration factor (e.g., 1.2).

When the current forward range of view is less than the targeted minimum threshold forward range of view for the current vehicle speed, the range control process 300 determines whether or not to initiate dropback of the vehicle longitudinal position at 306 before determining a dropback adjustment at 308. In this regard, the range control process 300 verifies or otherwise confirms one or more dropback criteria are satisfied before initiating a dropback adjustment. In exemplary implementations, the guidance system 78 verifies that the targeted minimum threshold forward range of view for the current vehicle speed is greater than an estimated distance between the current longitudinal position of the host vehicle 10 and the current longitudinal position of the CIP vehicle ahead of the host vehicle 10. In this regard, when the estimated distance to the CIP vehicle is greater than the targeted minimum threshold forward range of view, the range control process 300 determines the CIP vehicle is not responsible for limiting the current forward range of view and that a dropback adjustment to increase the total following distance between the CIP vehicle and the host vehicle 10 is inappropriate to increase the current forward range of view. In some implementations, the sensor fusion system 74 outputs or otherwise provides indicia of the CIP vehicle and a corresponding estimate of the distance (or range) between the host vehicle 10 and the CIP vehicle. In some implementations, prior to initiating a dropback, the guidance system 78 may also verify or otherwise confirm that the current vehicle speed is within a desired range of vehicle speeds for which dropback is enabled, that the autonomous lane centering control mode is active, and that a number of consecutive vehicle cutoffs maintained by a counter (described in greater detail below) is equal to zero. For example, as described in greater detail below in the context of FIG. 4, in some implementations, the range control process 300 implements a counter to track or otherwise monitor the number of times vehicles other than the CIP vehicle cut in front of the host vehicle 10 while performing a dropback adjustment and disables or otherwise terminates the dropback adjustment when the value of the counter is greater than a threshold number (e.g., 2 consecutive cutoffs) in order to limit the number of consecutive cutoff events. In one or more implementations, in response to the number of consecutive cutoffs exceeding the threshold, the range control process 300 initiates a timer and waits a threshold duration of time (e.g., 300 seconds) before reenabling the dropback adjustment at 306.

When the applicable dropback criteria are satisfied, the range control process 300 calculates or otherwise determines a dropback adjustment distance as described in greater detail below in the context of the dropback determination process 400 of FIG. 4. The dropback adjustment distance is provided as an input to the longitudinal solver module to increase or otherwise augment the following distance (or gap time) between the CIP vehicle and the host vehicle 10, resulting in the longitudinal solver module generating a longitudinal motion plan output that increases the distance between the CIP vehicle and the host vehicle 10 to correspondingly increase the forward range of view.

Still referring to FIG. 3, at 310, the range control process 300 determines whether or not to initiate a lateral adjustment of the vehicle within the current lane of travel before determining a lateral offset adjustment at 312. In this regard, the range control process 300 verifies or otherwise confirms one or more lateral offset criteria are satisfied before initiating a lateral offset adjustment. In exemplary implementations, the guidance system 78 verifies that the estimated width of the CIP vehicle is greater than a threshold width (e.g., 1.5 meters). In this regard, when the estimated width of the CIP vehicle is less than the threshold width, the range control process 300 determines the width of the CIP vehicle is not responsible for limiting the current forward range of view and that a lateral adjustment is inappropriate to increase the current forward range of view. In some implementations, prior to initiating a lateral adjustment, the guidance system 78 may also verify or otherwise confirm that the current vehicle speed is within a desired range of vehicle speeds for which lateral adjustments are enabled, that the autonomous lane centering control mode is active, and that the roadway curvature at or within a threshold distance of the current vehicle location is less than a threshold (e.g., 0.0005/m). In this regard, in addition to estimating lane line lengths, the sensor fusion system 74 may output an estimated curvature for each of the left lane boundary (or left lane line) and the right lane boundary (or right lane line) for the current lane of travel.

When the applicable lateral adjustment criteria are satisfied, the range control process 300 calculates or otherwise determines a lateral offset distance and a lateral adjustment direction as described in greater detail below in the context of the lateral adjustment process 500 of FIG. 5. The lateral offset distance is provided as an input to the lateral solver module to laterally offset the lateral position of the vehicle in the determined lateral adjustment direction relative to the centerline for the current lane of travel, resulting in the lateral solver module generating a lateral motion plan output that laterally maneuvers the host vehicle 10 within the current lane of travel away from the centerline to laterally offset the position of the host vehicle 10 relative to the CIP vehicle reduce the amount of obstruction by the CIP vehicle and increase the forward range of view.

Still referring to FIG. 3, the range control process 300 updates the trajectory plan for the host vehicle to incorporate the dropback adjustment and/or lateral offset adjustment at 314. In this regard, as described above, an active dropback adjustment distance increases or otherwise augments the following distance (or gap time) utilized by the longitudinal solver module when generating a longitudinal motion plan output to alter or otherwise update the longitudinal trajectory of the host vehicle 10 to increase the distance between the CIP vehicle and the host vehicle 10 (e.g., by decelerating the host vehicle 10 at one or more locations in the future along the route to achieve a total distance from the CIP vehicle equal to the sum of the default or normal following distance and the dropback adjustment distance). Concurrently, any active lateral offset distance and direction are utilized by the lateral solver module when generating a lateral motion plan output to alter or otherwise update the lateral trajectory of the host vehicle 10 within the current lane of travel to at least temporarily deviate from the centerline of the current lane of travel (e.g., by steering the vehicle 10 at one or more locations in the future along the route to offset the vehicle 10 from the lane centerline in the desired direction by the desired offset adjustment).

At 316, the range control process 300 determines whether any applicable exit criteria are satisfied or an exit condition for terminating the adjustments exists. For example, the range control process 300 may verify or otherwise confirm that that the autonomous lane centering control mode is still active, that the CIP vehicle remains present in front of the host vehicle 10, that the current vehicle speed is within a desired range of speeds, and/or the like. In the absence of an exit condition, the range control process 300 repeats the loop defined by 306, 308, 310, 312 and 314 to dynamically vary the dropback adjustment distance and/or the lateral offset adjustment distance as the host vehicle 10 travels (e.g., to account for changes in the speed of the host vehicle 10, changes in the speed or lateral position of the CIP vehicle, and/or the like). When the exit criteria are satisfied or an exit condition otherwise exists, the range control process 300 progressively decreases the dropback adjustment and/or lateral offset adjustment to zero at 318. In this regard, when the CIP vehicle changes lanes and is no longer present or inhibiting the forward range of view, any currently active dropback adjustment and/or lateral offset adjustment may be progressively decremented or ramped down to avoid abrupt changes to the vehicle position and maintain passenger comfort while reverting to the normal configuration of the autonomous lane centering control mode.

Figure 4:
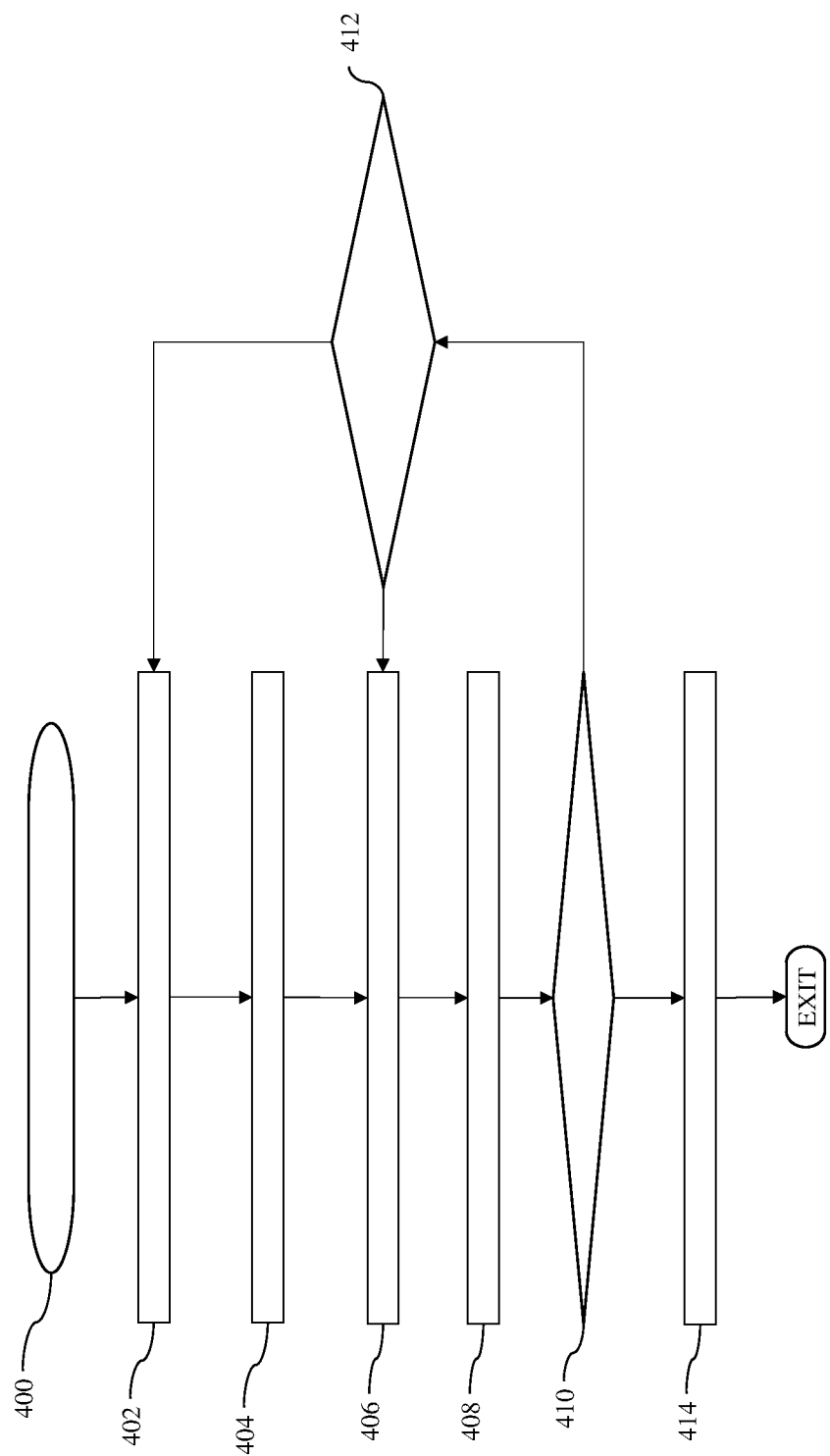
FIG. 4 depicts a flow diagram of a dropback determination process suitable for implementation by the ADS of FIG. 2 in connection with the range control process of FIG. 3 according to one or more aspects described herein.

FIG. 4 depicts an exemplary implementation of a dropback determination process 400 suitable for use in connection with the range control process 300 at 308 to determine a dropback distance for increasing the following distance (or gap time) relative to a CIP vehicle ahead of a host vehicle to improve the forward range of view for a camera or other forward-looking sensing device onboard the host vehicle. For illustrative purposes, the following description may refer to elements mentioned above in connection with FIGS. 1-2. While portions of the dropback determination process 400 may be performed by different elements of a vehicle system, for purposes of explanation, the subject matter may be primarily described herein in the context of the dropback determination process 400 being primarily performed by the guidance system 78 of the ADS 70 implemented by the controller 34 associated with the vehicle 10.

At 402, the dropback determination process 400 calculates or otherwise determines the difference in distance between the targeted forward range of view for the sensing device and the estimated distance between the CIP vehicle and the host vehicle and then multiplies the difference by a calibratable gain factor to calculate a maximum dropback distance adjustment at 404. In this regard, the maximum dropback distance is a function of the difference between where the CIP vehicle currently is in relation to the host vehicle 10 and where the host vehicle 10 could be relative to the CIP vehicle to ensure the targeted forward range of view can be achieved while the CIP vehicle is present. Thereafter, at 406, the dropback determination process 400 incrementally or progressively increases the value of the dropback adjustment distance that is provided to the longitudinal solver module or otherwise utilized to augment the following distance from zero (or another initial value) until reaching the calculated maximum dropback distance adjustment. In this regard, for each iteration or update of the longitudinal motion plan, the dropback adjustment distance may progressively increase or ramp up until achieving the value of the maximum dropback distance adjustment in the absence of any countervailing exit conditions (e.g., the CIP vehicle no longer being present at 316). In some implementations, the dropback adjustment distance may be incrementally increased by a fixed calibratable value (which in some implementations may vary depending on the current vehicle speed or be calculated as a function of the current vehicle speed), while in other implementations, the dropback adjustment distance may be incrementally increased by a percentage or fraction of the maximum dropback distance.

In the illustrated implementation, while increasing and/or maintaining the dropback distance adjustment, the dropback determination process 400 monitors for vehicle cutoff events at 408 and detects or otherwise identifies when the number of vehicle cutoff events exceeds an exit threshold at 410. In this regard, as described above, the guidance system 78 may implement a counter or similar feature to monitor the output of the sensor fusion system 74 to detect or otherwise identify each time a different vehicle other than the previous CIP vehicle cuts in front of the host vehicle 10 while implementing a dropback adjustment in order to terminate the dropback adjustment when the number of consecutive cutoff events is greater than a threshold number of allowable consecutive cutoff events. While the number of observed cutoff events is less than the maximum allowable threshold amount, the dropback determination process 400 monitors the speed (or velocity) of the host vehicle at 412 to verify that the current vehicle speed is within a threshold of the initial reference vehicle speed utilized to calculate the maximum dropback distance adjustment at 402.

When the current vehicle speed is within a threshold of the initial vehicle speed at the time of initiating the dropback determination process 400, the dropback determination process 400 continues incrementally increasing the dropback adjustment distance while monitoring for cutoff events at 406, 408 and 410. In this regard, once the initially calculated maximum dropback distance adjustment is achieved, the dropback determination process 400 monitors the speed (or velocity) of the host vehicle at 412 to dynamically adjust the dropback distance adjustment in response to changes to the speed of the host vehicle by more than a threshold amount (e.g., by more than 15 miles per hour). For example, as described above, the targeted forward range of view may be determined as a function of the current vehicle speed at the time of initiating the dropback adjustment using a lookup table to identify the targeted minimum threshold forward range of view. Thereafter, at 412, when the dropback determination process 400 determines the current vehicle speed deviates from the initial reference vehicle speed utilized to determine the initially-targeted forward range of view at 402 by more than a threshold value, the dropback determination process 400 dynamically calculates or otherwise determines an updated difference between the minimum threshold forward range of view for the current vehicle speed (e.g., obtained from the lookup table using the new current vehicle speed as the input value) and the currently-estimated distance between the CIP vehicle and the host vehicle at 402 and then calculates or otherwise determines an adjusted maximum dropback distance adjustment as a function of the updated difference at 404.

For example, in one implementation, the adjusted maximum dropback distance adjustment is calculated by multiplying the sum of the previously calculated maximum dropback distance adjustment and the updated difference using the same gain factor that was utilized to calculate the maximum dropback distance adjustment at 402 to arrive at the adjusted maximum dropback distance adjustment. Thereafter, the dropback determination process 400 incrementally increases or decreases the dropback distance until reaching the adjusted maximum dropback distance adjustment at 406. In this regard, as the host vehicle speeds up, a greater forward range of view may be desired, which, in turn, results in the dropback determination process 400 dynamically increasing the dropback distance substantially in real-time. On the other hand, when the host vehicle 10 slows down, a shorter minimum threshold forward range of view may be desired, in which case, the dropback determination process 400 may dynamically decrease the dropback distance to account for reduced vehicle speeds and reduce the likelihood of cutoff events.

Still referring to FIG. 4, at 410, when the dropback determination process 400 determines that the number of consecutive cutoff events exceeds the threshold number of allowable cutoff events, the dropback determination process 400 incrementally decreases the dropback distance adjustment back to zero at 414. In this manner, the guidance system 78 may progressively decrement or decrease the value of the dropback adjustment distance that is provided to the longitudinal solver module or otherwise utilized to augment the following distance from the current value until reaching a value of zero for the dropback distance adjustment. As a result, for each iteration or update of the longitudinal motion plan, the dropback adjustment distance may progressively decrease causing the longitudinal motion plan to progressively reduce the total following distance between the CIP vehicle and the host vehicle 10 in a corresponding manner. In a similar manner as described above, depending on the implementation, the dropback adjustment distance may be incrementally decreased by a fixed calibratable value, while in other implementations, the dropback adjustment distance may be incrementally decreased by a percentage or fraction of the maximum dropback distance.

Figure 5:
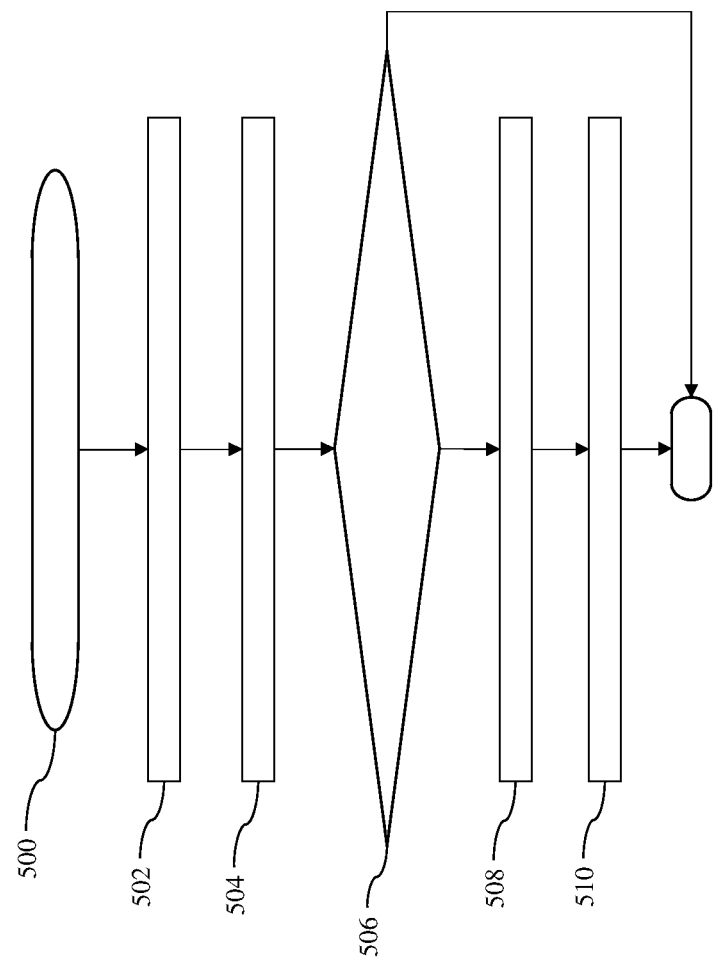
FIG. 5 depicts a flow diagram of a lateral adjustment process suitable for implementation by the ADS of FIG. 2 in connection with the range control process of FIG. 3 according to one or more aspects described herein.

FIG. 5 depicts an exemplary implementation of a lateral adjustment process 500 suitable for use in connection with the range control process 300 at 312 to determine a lateral offset direction and a lateral offset distance for steering the host vehicle relative to a CIP vehicle while maintaining the host vehicle in the current lane of travel to improve the forward range of view for a camera or other forward-looking sensing device onboard the host vehicle. For illustrative purposes, the following description may refer to elements mentioned above in connection with FIGS. 1-2. While portions of the lateral adjustment process 500 may be performed by different elements of a vehicle system, for purposes of explanation, the subject matter may be primarily described herein in the context of the lateral adjustment process 500 being primarily performed by the guidance system 78 of the ADS 70 implemented by the controller 34 associated with the vehicle 10.

The lateral adjustment process 500 begins at 502 by calculating or otherwise determining assessment scores for both lane boundaries of the current lane of travel during an assessment window and then determining the lateral offset direction based on the lane boundary assessment scores at 504. For example, as described above, the sensor fusion system 74 may output or otherwise provide indicia of the estimated viewable length of the left lane boundary and the estimated viewable length of the right lane boundary for the current lane of travel. Additionally, the sensor fusion system 74 may output or otherwise provide a confidence value or other indicia of a quality associated with the respective lane boundary. In this regard, the quality indicia provided by the sensor fusion system 74 may be influenced by neighboring traffic, curbs, or other environmental factors that may impair the ability of the sensor fusion system 74 to detect, discern or otherwise identify the lane boundary. For each lane boundary, the guidance system 78 may calculate or otherwise determine an assessment score associated with the respective lane boundary as a sum of a first product of the estimated viewable length of the respective lane boundary and a first gain coefficient (or weighting factor) and a second product of the estimated quality associated with the respective lane boundary and a second gain coefficient (or weighting factor). To determine the offset direction, the guidance system 78 implements a counter associated with each respective lane boundary, and during each update or iteration of the guidance system 78, the guidance system 78 increments the value of the counter associated with the lane boundary having the highest assessment score calculated for that iteration. After the assessment window of time has elapsed, the guidance system 78 identifies the side associated with the respective lane boundary having the highest counter value as the direction in which the lateral offset should occur (e.g., by laterally maneuvering the host vehicle 10 closer to the lane boundary having the more consistently higher assessment score).

In exemplary implementations, the lateral adjustment process 500 verifies or otherwise confirms that there is not risk of encroachment by another vehicle, obstacle, or other object from the determined lateral offset direction at 506. In this regard, the guidance system 78 analyzes the output provided by the sensor fusion system 74 to verify or otherwise confirm the absence of adjacent traffic in the adjacent lane in the determined offset direction or potentially other encroaching objects from the determined offset direction before enabling the lateral offset adjustment. For example, if the determined lateral offset direction is towards the left and there is another vehicle traveling alongside the host vehicle 10 in the next lane adjacent to the current lane of travel on the left side of the current lane of travel, the lateral adjustment process 500 may determine that a potential risk of encroachment exists and exits without performing a lateral offset adjustment. On the other hand, if the determined lateral offset direction is towards the left and there is no vehicle traveling in the next lane adjacent to the current lane of travel on the left side of the current lane of travel that is within a threshold distance of the host vehicle 10, the lateral adjustment process 500 may determine that a risk of encroachment in the lateral offset direction does not exist and proceeds with implementing the lateral offset adjustment.

At 508, after determining the direction for the forward range-based lateral offset adjustment and verifying the lateral offset adjustment does not increase risk of encroachment, the lateral adjustment process 500 continues by progressively or incrementally increasing the range-based lateral offset amount in the determined lateral offset direction until reaching a maximum allowable amount of range-based lateral offset. In a similar manner as described above in the context of the dropback adjustment, the guidance system 78 progressively increases the magnitude of the range-based lateral offset adjustment in the determined direction relative to the lane centerline from an initial zero value until reaching a maximum allowable value for the range-based lateral offset adjustment. In this regard, the maximum allowable value for the range-based lateral offset adjustment may be configured to limit or otherwise prevent the host vehicle 10 from deviating from the lane centerline by more than a fixed amount that ensures an adequate buffer distance between the host vehicle 10 and the nearest lane boundary and reduces the likelihood of driver intervention in response to the lateral offset (e.g., due to perception that the lane centering autonomous control mode is not functioning correctly). Thus, for each iteration or update of the lateral motion plan, while the range-based lateral offset adjustment is enabled, the lateral offset adjustment distance may progressively increase or ramp up until achieving the value of the maximum range-based lateral offset adjustment in the absence of any countervailing exit conditions (e.g., the CIP vehicle no longer being present at 316). In exemplary implementations, the lateral offset adjustment distance is incrementally increased by a fixed calibratable value (which in some implementations may vary depending on the current value for the vehicle speed or other factors).

In one or more exemplary implementations, to implement the lateral offset adjustment, the lateral adjustment process 500 blends or otherwise combines the range-based lateral offset with any other active lateral offsets to obtain a total lateral offset adjustment to be utilized for the lateral motion plan at 510. For example, depending on the implementation, the guidance system 78 and/or the ADS 70 may independently calculate or otherwise determine one or more lateral offset adjustments to be applied based on roadway conditions (e.g., whether or not opposing traffic is divided, roadway curvature, encroaching vehicles, etc.). When the range-based lateral offset is in the opposite direction of the cumulative net amount of the other lateral offsets, the lateral adjustment process 500 adds or otherwise combines the value for the range-based lateral offset and the net lateral offset value to arrive at a value for the total lateral offset adjustment to be utilized by the lateral motion planner. For example, if the range-based lateral offset value is ten centimeters to the left (−10 cm) and the net amount of the other lateral offsets is twenty centimeters to the right (+20 cm), the lateral adjustment process 500 adds the values to arrive at a total lateral offset adjustment of ten centimeters to the right (+10 cm).

On the other hand, when the range-based lateral offset is in the same direction as the net other lateral offsets, the lateral adjustment process 500 selects the offset having the greatest magnitude of the lateral offset adjustment distance to be implemented. For example, if the range-based lateral offset value is ten centimeters to the left (−10 cm) and the net amount of the other lateral offsets is five centimeters to the left (−5 cm), the lateral adjustment process 500 selects or otherwise identifies the value of the range-based lateral offset value for use as the total lateral offset adjustment distance (10 cm) and lateral offset direction (negative or to the left) as the value to be provided as input to the lateral solver module. In this regard, as the range-based lateral offset value is incrementally increased in the same direction as the other active offsets (e.g., at 508), the range-based lateral offset value may increase the magnitude of the lateral offset to increase the forward range of view by accounting for the presence and/or width of the CIP vehicle in addition to the other roadway conditions making a lateral offset in that direction desirable. As described above, the lateral solver module utilizes the total lateral offset adjustment in the autonomous lane centering control mode to generate a lateral motion plan output for controlling the lateral movement of the vehicle 10 within the current lane of travel by steering the vehicle 10 at one or more locations in the future along the route to maintain the lateral position of the vehicle at the input lateral offset distance from the lane centerline in the determined lateral offset direction.

Figure 6:
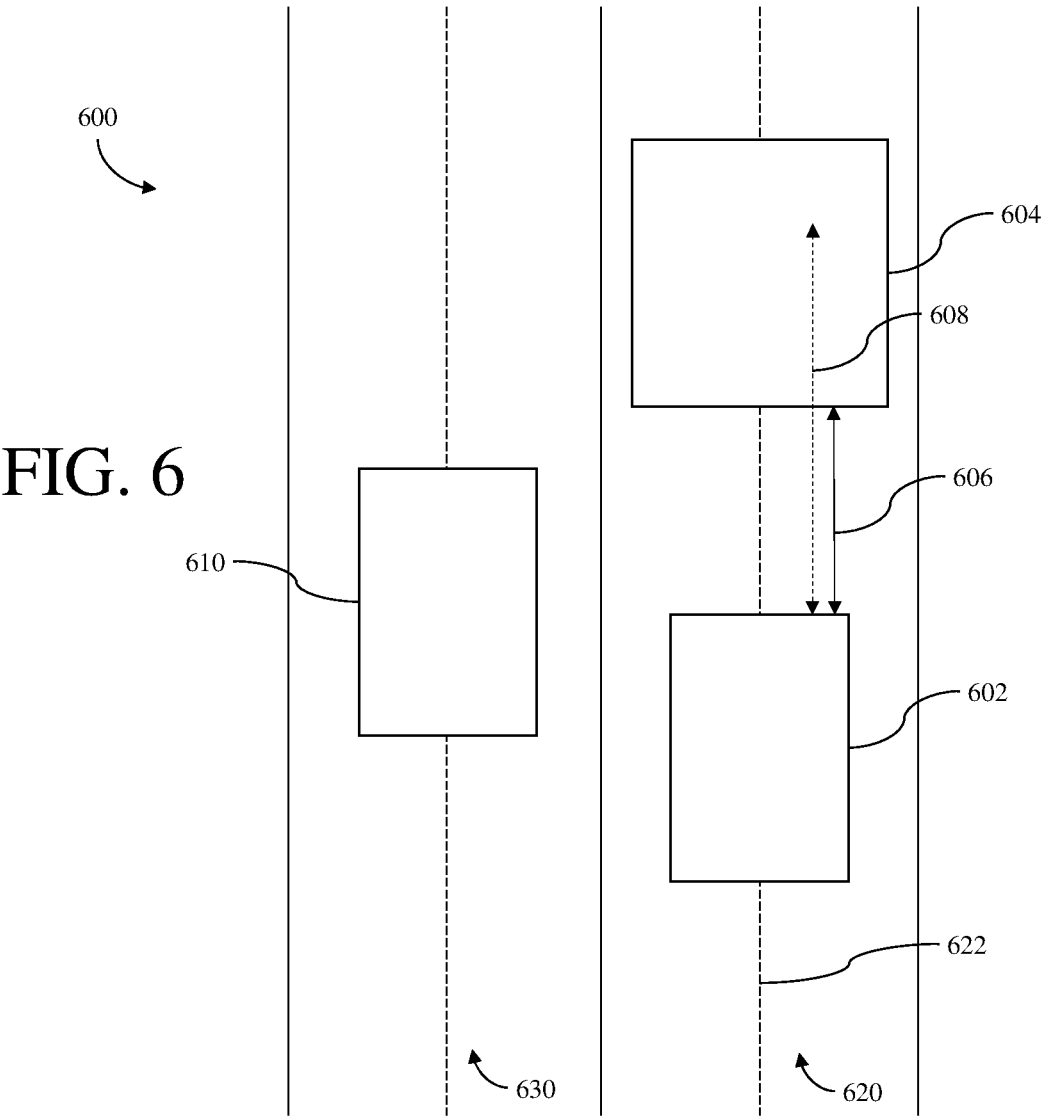
FIGS. 6-7 depict a sequence of different states for an exemplary scenario for an example implementation of the range control process of FIG. 3 according to one or more aspects described herein.
Figure 7:
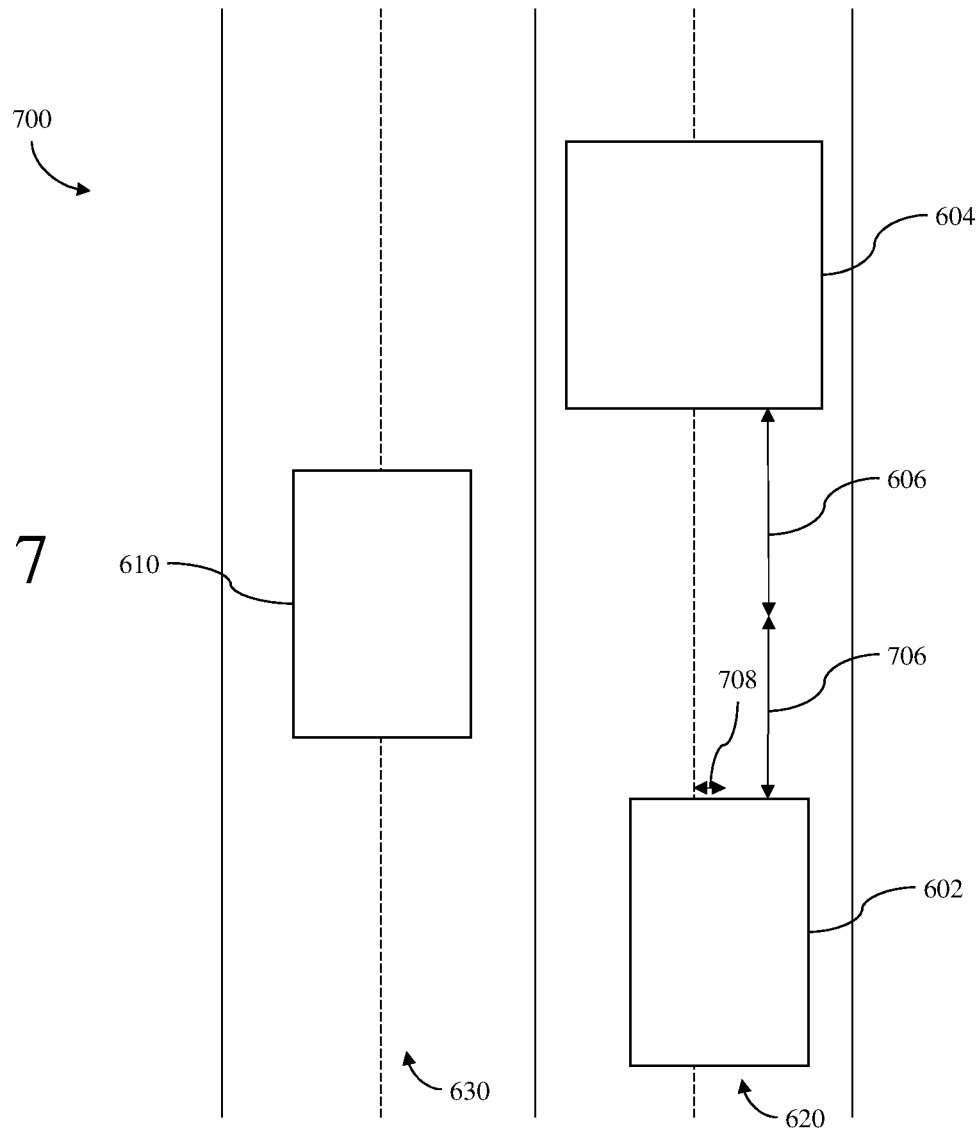

FIGS. 6-7 depict an exemplary sequence of scenarios illustrating the range control process 300 of FIG. 3 at a vehicle 602, which could be an instance of vehicle 10. FIG. 6 depicts an initial state 600 of the vehicle 602 traveling along a route within a first lane 620 behind another vehicle 604 while being operated in a Level Two autonomous operating mode that attempts to maintain the vehicle 602 substantially centered within the current lane 620 of travel along the lane centerline 622 at a user-defined velocity, subject to other user-defined or user-configurable constraints (e.g., separation distances from other vehicles and the like). FIG. 6 depicts a CIP vehicle 604 in the current lane 620 that is ahead of the host vehicle 602 by a separation distance 606 that is less than the distance corresponding to the targeted forward range of view 608 for the current speed of the host vehicle 602, thereby inhibiting a camera or other forward-looking sensing device onboard the host vehicle 602 from achieving the targeted forward range of view 608. Additionally, the width of the CIP vehicle 604 is greater than the width of the host vehicle 602, thereby potentially inhibiting the ability of the camera or other sensing device onboard the host vehicle 602 from achieving the targeted forward range of view 608 of the lane boundaries for the current lane 620.

FIG. 7 depicts an updated state 700 of the vehicle 602 after execution of the range control process 300 to perform a dropback adjustment in accordance with the dropback determination process 400 to increase the separation distance 606 utilized by the longitudinal solver module by a dropback adjustment distance 706 that temporarily increases the distance between the host vehicle 602 and the CIP vehicle 604 to help achieve the targeted forward range of view 608 of the lane boundaries of the current lane 620. As described above, the dropback adjustment distance 706 may be calculated as a function of the difference between the targeted forward range of view 608 and the estimated distance 606 to the CIP vehicle 604 (e.g., by subtracting the estimated distance 606 from the target distance 608 and multiplying the result by a gain factor to obtain the dropback adjustment distance 706). Additionally, FIG. 7 depicts a scenario where the range control process 300 also performs a lateral offset adjustment in accordance with the lateral adjustment process 500 of FIG. 5 to deviate laterally from the lane centerline 622 by a lateral offset adjustment distance 708 to the right of the lane centerline 622. For example, the presence of another vehicle 610 in the adjacent lane 630 on the left side of the current lane 620 may reduce the quality or accuracy associated with the left lane boundary of the current lane 620 determined by the sensor fusion system 74, which, in concert with the presence of the potentially encroaching vehicle 610 in the adjacent lane 630, causes the lateral adjustment process 500 to determine the desired lateral offset direction as to the right and correspondingly provide lateral offset adjustment indicia to the lateral solver module to steer the host vehicle 602 towards the right to further improve the visibility of the lane boundaries associated with the current lane 620.

As described above, in exemplary implementations, between the initial state 600 and the subsequent state 700, the forward range of view adjustment distances 706, 708 are progressively increased from zero values at the initial state 600 to the values depicted in the subsequent state 700. Thereafter, when the CIP vehicle 604 is no longer present or some other exit condition is satisfied (e.g., at 316), the forward range of view adjustment distances 706, 708 may be progressively decreased back to zero (e.g., at 318). For example, when one or more vehicles 610 from the adjacent left lane 630 enter into the current lane 620 between the host vehicle 602 and the previous CIP vehicle 604 to cause the number of cutoff events to exceed the threshold number of allowable consecutive cutoffs (e.g., at 410), the dropback adjustment distance 706 may be progressively reduced back to zero to reduce the likelihood of additional cutoff events. Similarly, if another vehicle 610 having a width that is less than or equal to the threshold width for performing a lateral offset adjustment cuts in front of the host vehicle 602 and becomes the updated CIP vehicle, the range control process 300 may determine a lateral offset adjustment is no longer necessary or desirable (e.g., at 310) and progressively reduce the lateral offset adjustment distance 708 back to zero when the CIP vehicle is no longer wider than the lateral offset adjustment enable threshold. In this regard, it will be appreciated that in practice, the forward range of view adjustment distances 706, 708 may dynamically vary depending on the current speed of the host vehicle 602 or to reflect the observed behavior of other vehicles 604, 610 and/or changes to the roadway conditions as the host vehicle 602 travels. In this manner, the targeted forward range of view for a camera or other forward-looking sensing device onboard the host vehicle 602 may be achieved to preserve autonomous lane centering control in a manner that minimizes driver intervention or passenger discomfort.

While at least one exemplary aspect has been presented in the foregoing detailed description, it should be appreciated that a vast number of variations exist. It should also be appreciated that the exemplary aspect or exemplary aspects are only examples, and are not intended to limit the scope, applicability, or configuration of the disclosure in any way. Rather, the foregoing detailed description will provide those skilled in the art with a convenient road map for implementing the exemplary aspect or exemplary aspects. It should be understood that various changes can be made in the function and arrangement of elements without departing from the scope of the disclosure as set forth in the appended claims and the legal equivalents thereof.

What is claimed is:

1. A method of controlling a vehicle in an autonomous lane centering control mode, the method comprising:
   determining, by a controller associated with the vehicle, a current value for a forward range of view associated with a sensing device onboard the vehicle by calculating an average of a first estimated viewable length associated with a left boundary of a current lane of travel and a second estimated viewable length associated with a right boundary of the current lane of travel over a preceding time interval;
   determining, by the controller, a target value for the forward range of view associated with the sensing device based at least in part on a speed of the vehicle; and
   in response to determining the current value is less than the target value:
      determining, by the controller, a dropback adjustment distance based at least in part on a difference between the target value for the forward range of view and an estimated distance to a closest in path (CIP) vehicle ahead of the vehicle within the current lane of travel;
      determining, by the controller, a longitudinal trajectory for the vehicle based at least in part on the dropback adjustment distance to increase the estimated distance to the CIP vehicle;
      determining, by the controller, a lateral offset adjustment distance when a width associated with the CIP vehicle is greater than a threshold;
      determining, by the controller, a lateral trajectory for the vehicle based at least in part on the lateral offset adjustment distance to offset the vehicle relative to a centerline associated with the current lane of travel; and
      autonomously operating, by the controller, one or more actuators onboard the vehicle in accordance with the longitudinal trajectory while concurrently operating the one or more actuators onboard the vehicle in accordance with the lateral trajectory to offset the vehicle relative to the centerline for a temporary period of time in the autonomous lane centering control mode to increase the forward range of view.

2. The method of claim 1, wherein determining the target value comprises obtaining the target value from a lookup table maintained in a data storage associated with the vehicle using the speed of the vehicle.

3. The method of claim 1, further comprising:
   determining, by the controller, when a second difference between a current speed of the vehicle and an initial speed of the vehicle associated with the target value is greater than a second threshold;
   and in response to determining the second difference is greater than the second threshold:
   determining, by the controller, an updated target value for the forward range of view associated with the sensing device based at least in part on the current speed of the vehicle; determining, by the controller, an updated dropback adjustment distance based at least in part on the updated target value and a current estimated distance between the CIP vehicle and the vehicle;
   determining, by the controller, an updated longitudinal trajectory for the vehicle based at least in part on the updated dropback adjustment distance; and autonomously operating, by the controller, the one or more actuators onboard the vehicle in accordance with the updated longitudinal trajectory.

4. The method of claim 1, further comprising progressively reducing the dropback adjustment distance when the CIP vehicle is no longer present ahead of the vehicle within the current lane of travel.

5. The method of claim 1, further comprising progressively reducing the dropback adjustment distance when a number of consecutive cutoff events is greater than a second threshold.

6. The method of claim 1, further comprising determining, by the controller, the first estimated viewable length associated with the left boundary of the current lane of travel and the second estimated viewable length associated with the right boundary of the current lane of travel based at least in part on one or more images or sensor data captured by the sensing device.

7. A vehicle comprising:
a data storage to maintain a lookup table;
one or more sensing devices onboard the vehicle;
one or more actuators onboard the vehicle; and
a controller that, by a processor, determines a current value for a forward range of view associated with a sensing device of the one or more sensing devices by calculating an average of a first estimated viewable length associated with a left boundary of a current lane of travel and a second estimated viewable length associated with a right boundary of the current lane of travel over a preceding time interval,
determines a target value for the forward range of view associated with the sensing device based at least in part on a speed of the vehicle using the lookup table,
determines a dropback adjustment distance based at least in part on a difference between the target value for the forward range of view and an estimated distance to a closest in path (CIP) vehicle ahead of the vehicle within the current lane of travel when the current value is less than the target value
determines a longitudinal trajectory for the vehicle based at least in part on the dropback adjustment distance to increase the estimated distance to the CIP vehicle
determines a lateral offset adjustment distance when a width associated with the CIP vehicle is greater than a threshold
determines a lateral trajectory for the vehicle based at least in part on the lateral offset adjustment distance to offset the vehicle relative to a centerline associated with the current lane of travel, and autonomously operates the one or more actuators onboard the vehicle in accordance with the longitudinal trajectory while concurrently operating the one or more actuators onboard the vehicle in accordance with the lateral trajectory to offset the vehicle relative to the centerline for a temporary period of time in an autonomous lane centering control mode to increase the forward range of view.

8. The vehicle of claim 7, wherein the sensing device comprises a camera.

9. The vehicle of claim 7, wherein the average comprises a rolling average of the first estimated viewable length associated with the left boundary of the current lane of travel and the second estimated viewable length associated with the right boundary of the current lane of travel over the preceding time interval.

10. The vehicle of claim 9, wherein: the sensing device comprises a camera; and the controller determines the first estimated viewable length associated with the left boundary of the current lane of travel and the second estimated viewable length associated with the right boundary of the current lane of travel based at least in part on one or more images captured by the camera.

11. The vehicle of claim 7, wherein the controller progressively reduces the dropback adjustment distance when the CIP vehicle is no longer present ahead of the vehicle within the current lane of travel.

12. The vehicle of claim 7, wherein the controller progressively reduces the dropback adjustment distance when a number of consecutive cutoff events is greater than a second threshold.

13. A non-transitory computer-readable medium comprising executable instructions that, when executed by a processor, cause the processor to:
determine a current value for a forward range of view associated with a sensing device onboard a vehicle by calculating an average of a first estimated viewable length associated with a left boundary of a current lane of travel and a second estimated viewable length associated with a right boundary of the current lane of travel over a preceding time interval;
determine a target value for the forward range of view associated with the sensing device based at least in part on a speed of the vehicle; and
in response to determining the current value is less than the target value:
determine a dropback adjustment distance based at least in part on a difference between the target value for the forward range of view and an estimated distance to a closest in path (CIP) vehicle ahead of the vehicle within the current lane of travel;
determine a longitudinal trajectory for the vehicle based at least in part on the dropback adjustment distance to increase the estimated distance to the CIP vehicle;
determine a lateral offset adjustment distance when a width associated with the CIP vehicle is greater than a threshold;
determine a lateral trajectory for the vehicle based at least in part on the lateral offset adjustment distance to offset the vehicle relative to a centerline associated with the current lane of travel; and
autonomously operate one or more actuators onboard the vehicle in accordance with the longitudinal trajectory while concurrently operating the one or more actuators onboard the vehicle in accordance with the lateral trajectory to offset the vehicle relative to the centerline for a temporary period of time in an autonomous lane centering control mode to increase the forward range of view.

14. The non-transitory computer-readable medium of claim 13, wherein the executable instructions cause the processor to determine the first estimated viewable length associated with the left boundary of the current lane of travel and the second estimated viewable length associated with the right boundary of the current lane of travel based at least in part on one or more images or sensor data captured by the sensing device.

15. The non-transitory computer-readable medium of claim 14, wherein the sensing device comprises a camera onboard the vehicle and the executable instructions cause the processor to determine the first estimated viewable length and the second estimated viewable length based at least in part on the one or more images captured by the camera onboard the vehicle.

16. The method of claim 1, wherein at least one of the dropback adjustment distance and the lateral offset adjustment distance is configured to increase an amount of a lane boundary or a lane line that is visible by the sensing device.

17. The method of claim 1, wherein autonomously operating the one or more actuators onboard the vehicle in accordance with the longitudinal trajectory while concurrently operating the one or more actuators onboard the vehicle in accordance with the lateral trajectory comprises automatically increasing a following distance or gap time for the temporary period of time while attempting to maintain a driver-selected speed.

18. The method of claim 1, wherein autonomously operating the one or more actuators onboard the vehicle in accordance with the longitudinal trajectory while concurrently operating the one or more actuators onboard the vehicle in accordance with the lateral trajectory comprises automatically adjusting a lateral position relative to a lane centerline to aid lane line detection.

19. The method of claim 17, wherein at least one of the dropback adjustment distance and the lateral offset adjustment distance is configured to increase an amount of a lane boundary or a lane line that is visible by the sensing device.

20. The method of claim 6, wherein at least one of the dropback adjustment distance and the lateral offset adjustment distance is configured to increase an amount of a lane boundary or a lane line that is visible by the sensing device.

* * * * *